US007685097B2

(12) United States Patent
St. John et al.

(10) Patent No.: US 7,685,097 B2
(45) Date of Patent: Mar. 23, 2010

(54) METHOD AND SYSTEM FOR AGGREGATING AND DISSEMINATING TIME-SENSITIVE INFORMATION

(75) Inventors: Ronald Kingsley St. John, Manotick (CA); Zdzislaw Rudolf Nowak, Ottawa (CA); Sean Patrick Lake, Ottawa (CA); Helen Abla Mawudeku, Nepean (CA); Michael Anthony Blench, Cardinal (CA)

(73) Assignee: Her Majesty the Queen in right of Canada as represented by the Minister of Health, Ottawa (CA)

( * ) Notice: Subject to any disclaimer, the term of this patent is extended or adjusted under 35 U.S.C. 154(b) by 333 days.

(21) Appl. No.: 11/057,215

(22) Filed: Feb. 15, 2005

(65) Prior Publication Data

US 2006/0004702 A1 Jan. 5, 2006

Related U.S. Application Data

(63) Continuation of application No. PCT/CA03/001219, filed on Aug. 13, 2003.

(60) Provisional application No. 60/403,442, filed on Aug. 15, 2002.

(51) Int. Cl.
*G06F 17/30* (2006.01)
*G06F 7/00* (2006.01)

(52) U.S. Cl. .................. 707/2; 707/1; 707/3; 707/7; 707/10; 707/100; 709/217; 600/300

(58) Field of Classification Search .................. 707/102, 707/1–3, 7, 10, 100; 709/217; 600/300
See application file for complete search history.

(56) References Cited

U.S. PATENT DOCUMENTS

| 5,175,684 | A | * | 12/1992 | Chong ........................... 704/3 |
| 5,576,952 | A | * | 11/1996 | Stutman et al. ............. 600/300 |
| 5,781,879 | A | | 7/1998 | Arnold et al. |
| 5,991,799 | A | | 11/1999 | Yen et al. |

(Continued)

FOREIGN PATENT DOCUMENTS

| CA | 2313385 | | 1/2002 |
| CA | 2313385 A1 | * | 1/2002 |

OTHER PUBLICATIONS

Davies, John et al, "Knowledge Discovery and Delivery", British Telecommunications Engineering, vol. 17, Apr. 1998, London, GB, pp. 25-35.

(Continued)

*Primary Examiner*—Jean B. Fleurantin
*Assistant Examiner*—Hares Jami
(74) *Attorney, Agent, or Firm*—Ogilvy Renault LLP; Christopher N. Hunter; Michael Van Eesbeek

(57) ABSTRACT

A method of aggregating and disseminating time sensitive information. A data source is searched to identify recently-posted information items matching predetermined selection criteria. A respective relevance score is calculated for each identified information item. A respective urgency rating is determined for each identified information item. Each information item is triaged using the urgency rating, and disseminated to at least one client based on the triage result.

22 Claims, 7 Drawing Sheets

U.S. PATENT DOCUMENTS

| | | | | |
|---|---|---|---|---|
| 6,012,053 | A | * | 1/2000 | Pant et al. ............... 707/3 |
| 6,901,398 | B1 | * | 5/2005 | Horvitz et al. ............ 707/5 |
| 2001/0018687 | A1 | | 8/2001 | Gonzalez et al. |
| 2002/0118796 | A1 | * | 8/2002 | Menard et al. ............ 379/45 |
| 2003/0212673 | A1 | * | 11/2003 | Kadayam et al. ......... 707/3 |

OTHER PUBLICATIONS

Bussey, Howard E. et al. "Service Architecture, Prototype Description, and Network Implications of a Personalized Information Grazing Service", IEEE 1990, pp. 10461053.

* cited by examiner

METHOD AND SYSTEM FOR AGGREGATING AND DISSEMINATING TIME-SENSITIVE INFORMATION

CROSS-REFERENCE TO RELATED APPLICATIONS

This application is a continuation of International Patent Application No. PCT/CA2003/001219 filed Aug. 13, 2003 and designating the United States, which is based on, and claims benefit under 35 U.S.C. §119(e) of U.S. Patent Application No. 60/403,442, filed Aug. 15, 2002.

MICROFICHE APPENDIX

Not applicable.

TECHNICAL FIELD

The present invention relates to knowledge management systems, and in particular to a method and system for aggregating and disseminating time-sensitive information with high relevancy.

BACKGROUND OF THE INVENTION

The development of the Internet has created an unprecedented opportunity to collect and disseminate information. For example, news articles from hundreds of sources, including major news organizations such as Reuters, United Press International, but also large numbers of small, local newspapers, are accessible through the Internet. In fact, virtually anyone can disseminate virtually any information content through the internet. A disadvantage of this situation is that a user desiring to research a particular topic of interest must navigate through possibly thousands of information items (e.g. web pages, news articles, downloadable documents etc.) in order to locate the few items that actually contain information that is relevant to their purposes. The difficulty of separating relevant and irrelevant information has traditionally been the primary impediment to the use of the internet for serious research.

Numerous search tools have been developed to facilitate the identification of relevant information items through the internet. Various search strategies are used by these search tools, such as, for example, keywords, Boolean operators, and syntactic analysis. Most of these strategies calculate some form of "relevancy score", which attempts to rate the "goodness of match" between an information item and the search criteria provided by the user.

When used by a skilled researcher, the known internet search tools can identify and retrieve information items that are highly relevant to the topic of interest. In this respect, the term "skilled researcher" refers to a person skilled in the use of the search tool(s) in question. This imposes a limitation in that successful use of the most sophisticated search engines, which are capable of generating the best search results, require a skill level beyond that of most users. In many cases, the user will be an expert in a field related to the information they are searching for, rather than the techniques needed to find that information. In order to overcome this limitation, various commercial search services (such as, for example, Factiva™, Dialog™, etc.) provide research consultants, who assist a user in developing the criteria needed to produce the desired search results. However, these research consultants can dramatically increase the cost of using the search service, which is undesirable.

Another limitation of known search tools is that they tend to produce the best results when the information of interest to the user can be narrowly defined. This enables highly targeted searches to be designed, and assists in identifying relevant information items. However, in some cases, a user may not be able to provide a narrow indication of what they are looking for. For example, a public health official may be interested in published news articles which refer to any infectious disease, or a class of diseases. Such a broadly defined field of interest will almost inevitably yield a great many news articles, most of which will be of no particular interest to the user.

Furthermore, once an information item of interest is found, the user may be particularly interested in other information items that are relevant to the first information item. Normally, this cannot be accommodated by the search tool without revising the search criteria, which will often be undesirable.

A still further limitation of known search tools is that they do not adequately handle time sensitive information. For example, a news article referring to a patient being admitted to a hospital with unusual symptoms may provide public health officials with an "early warning" of an outbreak of an infectious disease. In such a case, timely identification and dissemination of that article to interested public health experts is critical. Furthermore, timely delivery of closely related articles (i.e. those referring to the same location, similar symptoms etc.) can also be critical to identifying and/or tracking the outbreak. While known search tools can identify information items that were published (or otherwise made accessible through the internet) within a selected time range, the rapid dissemination of relevant information items to the interested users is not adequately addressed.

Thus a method and system capable of rapidly aggregating time-sensitive information from multiple heterogeneous sources, assessing the relevance of the aggregated information, and then distributing the information to interested users, all with minimum time delay, remains highly desirable.

SUMMARY OF THE INVENTION

Accordingly, an object of the present invention is to provide a method and system for aggregating and disseminating highly relevant time sensitive information.

This object is met by the features of the present invention defined in the independent claim(s). Further, optional features of the inventions are defined in the dependent claims.

Thus, the present invention provides a system for aggregating time-sensitive information from heterogeneous data sources, and distributing the aggregated information to users with a high degree of relevance. Each data source is searched at regular intervals to identify new information items that satisfy predetermined search criteria and that have been posted since the immediately previous search. The search frequency for each source is selected based on an expected update frequency of the involved source. New information items are then examined to identify duplicates. When duplicates are found, the earliest posted item is identified and retained, while the other duplicate items are discarded. Each information item is then analyzed to apply meta-data in accordance with a predetermined taxonomy, and a relevancy score is calculated. Items having a high relevancy score are stored in association with other related information items (e.g. using the meta-data), while items of questionable relevance are passed to a gatekeeper for review. The gatekeeper applies intelligence and knowledge to assess the relevance of any items it receives, either by means of a human expert or artificial intelligence. If the gatekeeper deems the item to be relevant, then it is stored in association with other related information items as above. Otherwise, the item is forwarded to a "discarded items" repository. Distribution of the aggregated information is performed by extracting a set of archived information items relevant to a subject of interest to a respective user. The extracted set is sorted in order of the posting time of each involved information item, and forwarded to the user. Various methods of delivery may be used, at the option of the user. Typical examples include e-mail alerts; a continuous "ticker-tape" display; and a webpage display.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides a method and system for aggregating time-sensitive information from heterogeneous data sources, and distributing the aggregated information to interested users with minimum latency. The system of the present invention is particularly useful for continuously gathering information from global sources (e.g. via the internet), processing that information to extract usable intelligence concerning a desired area of subject matter, and then distributing that information to interested users. A typical example of an area of subject matter in which the present invention may usefully be deployed is public health, in which the ability to rapidly gather and distribute public health intelligence to interested experts may be essential to the effective detection, tracking and control of disease outbreaks.

Figure 1:
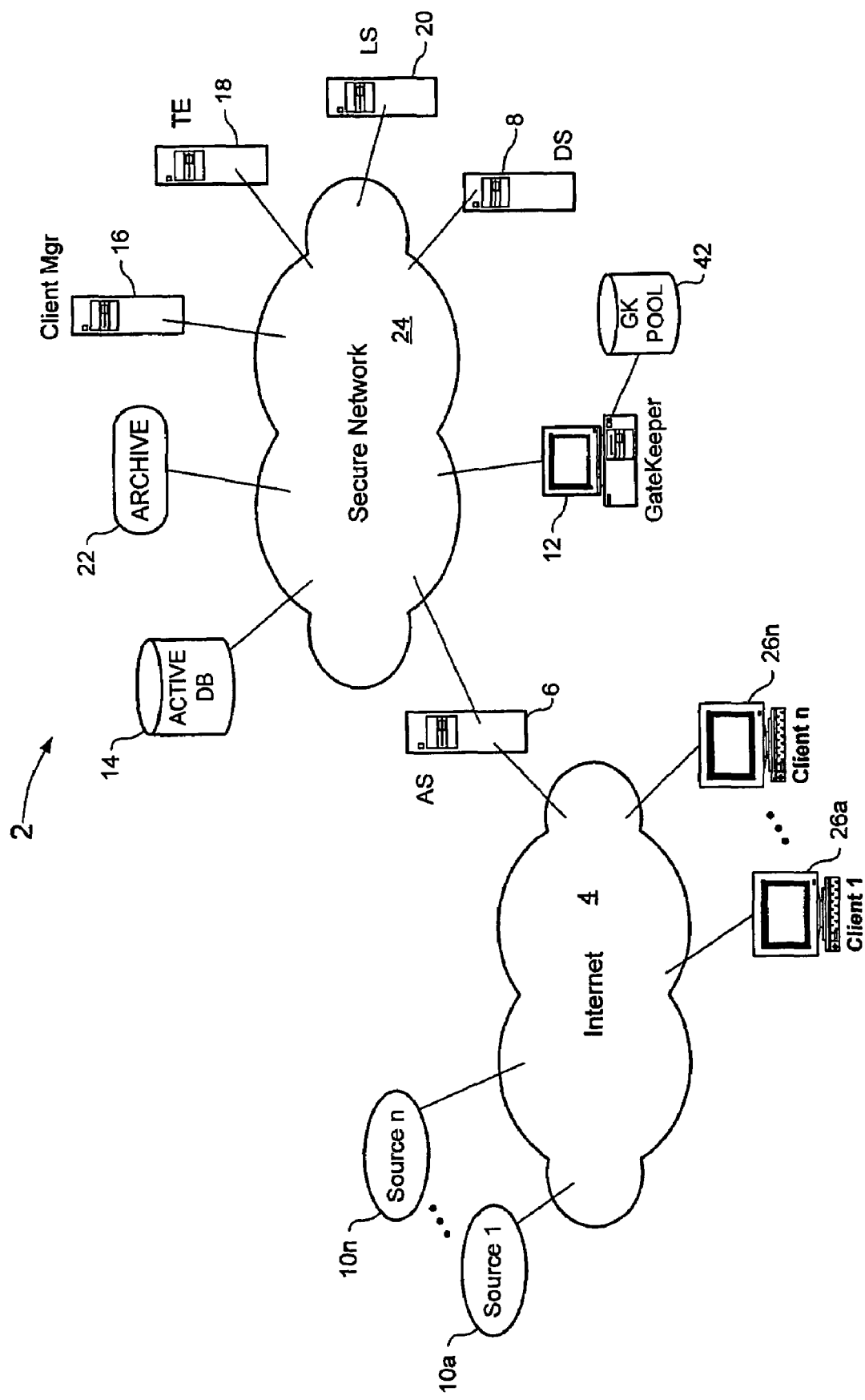
FIG. 1 schematically illustrates a system for aggregating and disseminating time sensitive information in accordance with an embodiment of the present invention.

As shown in FIG. 1, an information system 2 in accordance with the present invention is preferably configured using a distributed architecture of functional elements coupled to the internet 4 via an access server 6. The access server 6 operates to provide access control and "firewall" functionality well known in the art, and thus will not be described in further detail. At a minimum, the functional elements forming the system 2 must include a Document Server (DS) 8 for processing "raw" information received from one or more data sources 10 via the internet 4 and/or other sources; a Gatekeeper function 12 for ensuring proper handling of the received information by the document server 8; and an Active Database (ADB) 14 for storing processed information. In the illustrated embodiment, these functional elements are supplemented by a client manager 16 for controlling client profiles; a translation engine (TE) 18 for generating machine-translated "gists" of information items processed by the document server; a Lexicon Server (LS) 20; and an archive 22. Functions performed by each of these elements will be described below. Each of the functional elements may be provided as any suitable combination of hardware and software. If desired, two or more functional elements may be co-resident at a common site, or within a common computer system. Alternatively, functional elements may be remote from one another and interconnected through a secure network 24, such as a Local Area Network (LAN) or a Wide Area Network (WAN), as shown in FIG. 1.

In the context of the present invention, the term "distributed architecture" should be understood to mean that the functional elements forming the system are maintainable substantially independently of other elements of the system. This is a well known technique that facilitates the development and maintenance of sophisticated systems.

In general, the information system 2 of the present invention implements a cascaded search algorithm in which one or more data sources 10 are searched to locate information items matching a broad set of selection criteria. The response set obtained from each source 10 is then parsed to separate individual information items and normalize item format; processed to assess relevance and urgency using a dynamically maintained taxonomy; triaged to provide expedited handling of urgent information items; and stored in the Active data base 14. Each client 26 can access the system 2 to retrieve information items from the active database 14 using narrow search criteria defining one or more specific areas of interest to that client. Information items deemed to have a high level of urgency can be automatically forwarded to each interested client, again, based on the narrow search criteria defining their respective area(s) of interest. Principal steps in this cascaded search algorithm, and operations of each functional element of the information system 2 in support of this algorithm, will now be described below with reference to FIGS. 2a-2b.

Figure 2A:
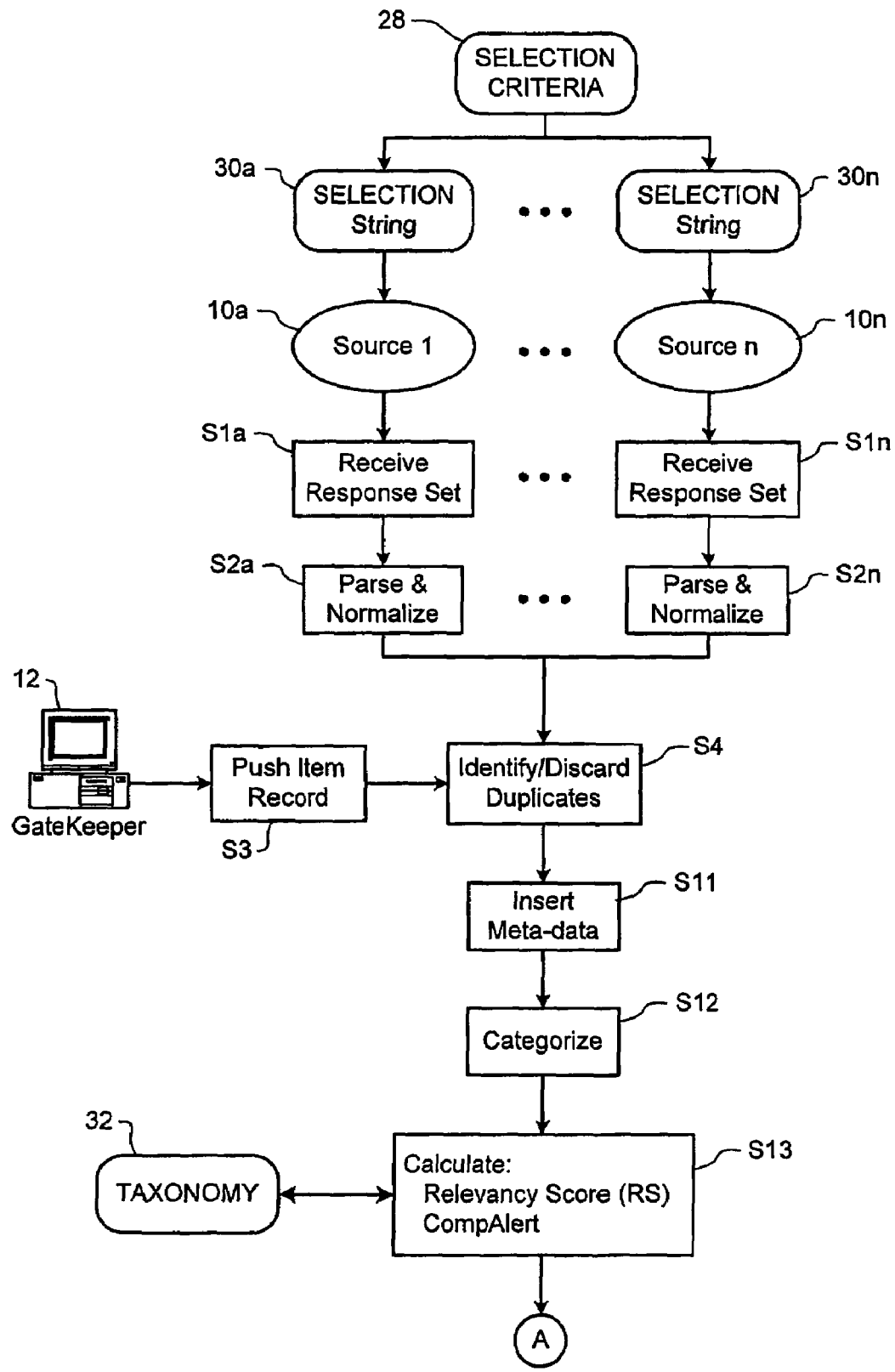
FIGS. 2a and 2b are flow charts schematically illustrating principal steps in a method for aggregating time sensitive information in accordance with an embodiment of the present invention.

As shown in FIG. 2a, a set of generic selection criteria 28 are defined to broadly encompass a desired class (or field) of information. For example, within a public health context, the selection criteria may be defined to encompass the following:

infectious diseases;

contaminated food, water and air. This may, for example, include information concerning food recalls, unsafe water supplies, water treatment methodologies, or pollution;

natural disasters such as floods, landslides and storms for their potential impact on public health;

nuclear safety (e.g. nuclear reactor accidents); product recalls and safety (e.g. lead, legislation, litigation, Workplace Hazardous Materials Information Systems (WHMIS) and workplace safety;

therapeutics, such as drug recalls, adverse reactions, new products, litigation, legislation, etc.; and bioterrorism Preferably, the selection criteria 28 are defined in a generic form, which is thus independent of the syntax and/or search methods required by any one data source. Based on these generic selection criteria, a respective selection string 30 or query is generated for each data source 10. This approach of generating selection strings 30 from a generic selection criteria 28 has an advantage in that, within the capabilities of each data source 10, all of the selection strings 30 will be substantially equivalent. If desired, the selection string for a particular data source 10 may be generated with the assistance of research consultants provided for that purpose by the involved data source 10. As mentioned previously, this has an advantage of improving the quality of the selection string, and thus the results obtained from that data source. Excessive cost is avoided because the selection string only needs to be generated (or updated) when the generic selection criteria change, and this is expected to be comparatively infrequent.

At predetermined intervals, the data source 10 is queried (or otherwise accessed) in order to obtain any recently-posted information satisfying the selection criteria 28. In general, any arbitrary interval may be used. However, preferably, the interval between successive searches will be equal to, or less than, the expected update frequency of the involved source, so as to minimize any delay between when information becomes available (i.e. is posted) and when it is retrieved by the system 2. If a particular data source 10 is expected to be updated at known times, then querying of that source can be timed to occur a short time after each expected update time.

Each data source generates a respective response set containing information items posted since the previous search, which is returned to the information system 2 for processing (at steps S1). In this context, an "information item" refers to a single news article, news-group posting or chat-room posting etc. The response set, which may include multiple concatenated information items, will normally be formatted in a manner that is unique to the data source 10. In cases where multiple heterogenous data sources are being searched (e.g. newsgroups, chat-rooms, news-feeds etc.) it is expected that corresponding heterogenous response set formats will be received. In all cases, however, the response set will contain information items that satisfy the generic search criteria 28.

Upon receipt of a response set from a data source 10, the document server 8 parses the response set (step S2) to extract each information item. At the same time, the format of each information item is normalized, so that common data processing and storage systems can be used through the rest of the system, independently of the source of each information item. Both of these operations (parsing and normalization) can be accomplished by analysing the response set using the known format of the respective data source, and mapping data from the response set into an item record having a generic format, such as that shown in FIG. 4.

Figure 4:
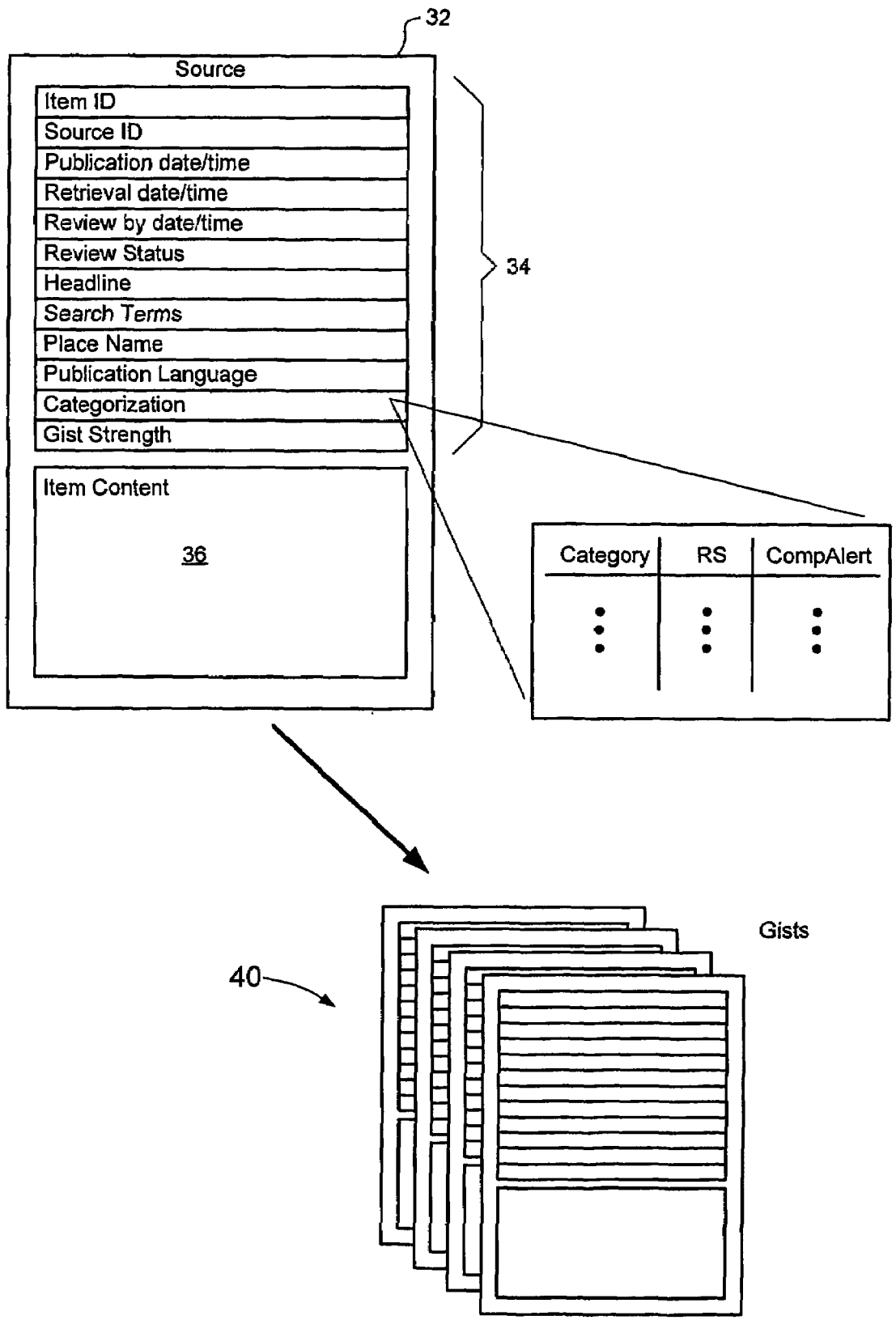
FIG. 4 is a block diagram illustrating a normalized format of an information item usable in the method of FIGS. 2a-2b.

In the example of FIG. 4, an item record 32 includes a header block 34 and a container 36. The header block 34 includes a number of fields for storing item identification information and meta-data generated by the document server 8, as will be described in greater detail below. The container 36 is used to store the body of the information item, that is, the content portion of the information item which is of primary interest to clients of the system.

For example, consider a response set containing news articles posted by a news-feed service such as United Press International. The response set (normally) comprises multiple news articles concatenated together within a single text document. Within this document, each article begins with tombstone data such as the source of the article, a location identifier, branding codifications and a posting time, all of which appear in a predetermined format and order. This tombstone data is then followed by the body of the article, and concludes with trailer information. Because this format is known in advance, it is a simple matter to analyze the response set to identify the number of articles, and where each article begins and ends.

For each article within the response set, a respective item record 32 is instantiated, and a unique item identifier assigned to facilitate subsequent processing and indexing. For each article, the tombstone data is copied to respective fields of the item record header 34, and the article body copied to the container 36. Once this processing is complete, the item record 32 contains all of the pertinent content of the originally received information item (news article) within the response set, but in a normalized format that is independent of the source 10 from which it was obtained.

As shown in FIG. 2a, a gatekeeper may also "push" (at step S3) information items into the system 2. For example, a gatekeeper 12 may elect to use search tools (e.g. web-crawlers, spiders, news-agents etc.) to gather information independently of the above described selection criteria-driven searches of information sources 10. In addition, a gatekeeper 12 may receive information (e.g. in an e-mail message) from a colleague. In order to enable this functionality, the gatekeeper 12 is provided with an interface (not shown) which enables the gatekeeper 12 to instantiate an information item record 32, and then populate each of its fields with appropriate information. Thus, the item identifier is automatically assigned by the system; the Gatekeeper ID is recorded as the source; and the time of creating the information item used as the posting time. The gatekeeper 12 can then insert the desired content into the container 36, in order to complete the information item record 32. At this point, the item record 32 can be forwarded to the document server 8, and handled in sequence with all other received information items, as will be described below. However, if desired, the gatekeeper 12 may also "force" the value of the relevancy score and/or the urgency rating (CompAlert status)) of the item, in order to control how the information item will be handled.

Following parsing and format normalization, information items (now encapsulated within respective item records) are compared to identify any duplicates (step S4). Such duplication of information items can frequently occur when, for example, a news article is originally published by one news service and subsequently "picked-up" and carried by another service. At a minimum, duplicate information items within the response set (from which the information item in question has been obtained) are identified. Preferably, however, each information item is also compared to previously processed information items. When duplicate information items are identified, the item having the earliest posting time (as determined by each item's tombstone data) is retained as the "original", and each of the duplicate information items discarded.

Figure 3:
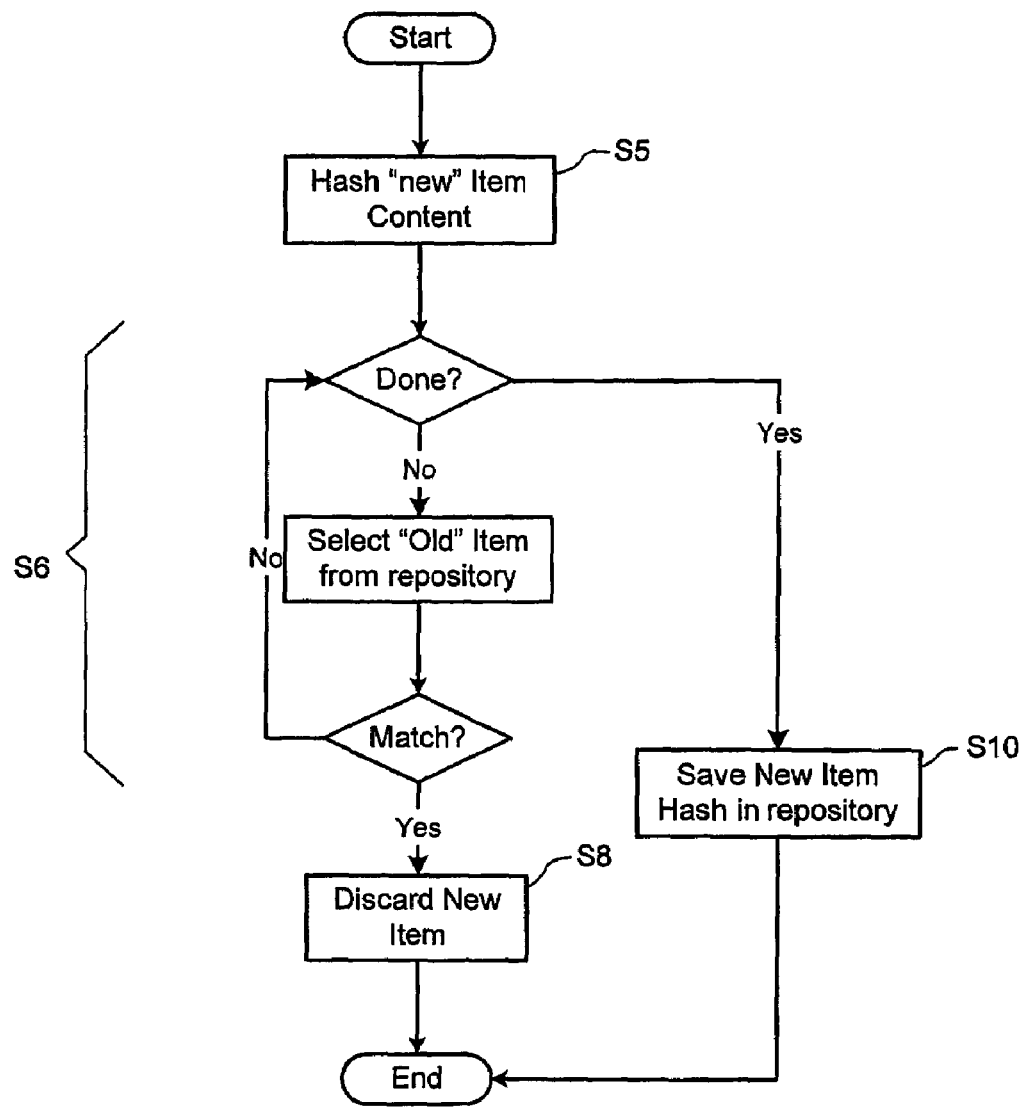
FIG. 3 is a flow chart showing principal steps in a method for identifying duplicate items, usable in the method of FIGS. 2a-2b.

As will be appreciated, various methods may be used to identify duplicate information items. FIG. 3 is a flow chart showing principal steps in a method in which the a hash of the content of a newly received information item is calculated (step S5). The hash result is then compared to hash results for previously-received information items (at S6), which are stored in a repository (not shown). If a match is found, then the newly received information item is considered to be a duplicate, and is discarded (at S8). If a matching item is not found in the repository, then it is determined that the newly received information item is the first instance of that item. Accordingly, its hash result is saved (at S10) along with at least its item ID in the repository. By this means, the system of the present invention is able to eliminate unnecessary information items, while at the same time continuously update the active database 14 to contain the earliest available information.

Returning to FIG. 2a, once duplicate information items have been identified and discarded, each remaining information item is then processed (at step S11) to derive meta-data which typifies the content of the information item stored in the item record container 36. Various known techniques, such as, for example, keyword and phrase matching, syntactical analysis, synonym matching etc. can be used to derive the meta-data. The advantage of this analysis is that it permits indexing, storage and retrieval of the information item based on the item content, but independent of both the language of the item content and the language of a client accessing the system. Preferably, the meta-data is encoded using language-independent alpha numeric codes, and stored in one or more fields of the item record header. If desired, the item tombstone data can also be encoded as meta-data.

Once the meta-data has been assigned to an information item, it is categorized (step S12) to identify specific areas of subject matter to which the information pertains. In general, a plurality of dynamically maintained information categories (or domains) may be maintained within the active database 14. Typically, these categories will be very narrowly defined. For example, continuing the public health example above, a "category" may be defined for a particular disease, or for a specific event (e.g. a disease outbreak, natural disaster, bio-terror attack etc.). In such cases, categorization enables the information item to be stored and indexed in association with other closely related information items (i.e. those pertaining to the event). It should be noted that an information item may very well pertain to several different categories. For example, a news article describing a flood may pertain to various categories such as infectious diseases; bacterial infections; (drinking) water contamination; and search and rescue.

Categorization may be based on keywords/phrases and their proximity to other keywords/phrases, synonyms, syntactical analysis, and taxonomy described above. It can also utilize the previously derived encoded meta-data saved in the item record header 34. If desired, categories to which the information item pertains can be indicated, again in a language-independent form, as part of the item's meta-data. By this means, clients can "mine" the active database 14 to identify information items pertaining to any desired particular category of information, independently of how those items are stored or indexed within the active database 14.

Following categorization, the item content saved in the container 36 can be processed (at S13) to compute a respective relevancy score (RS) and urgency rating (composite alert or "CompAlert" status) for each category to which the item pertains. As mentioned previously, the data source 10 will normally compute a score for each item in the response set, based on the quality of match between the item in question and the selection criteria 28. In the present invention, the score computed by the data source 10 is not used. Instead, the relevancy score (RS) computed by the present invention is based on the (usually) narrow definition of each involved category, and may utilize conventional techniques such as keywords and phrases and their proximity to other keywords/phrases, synonyms, syntactical analysis. Preferably, however, a predetermined taxonomy is used (possibly in conjunction with other, conventional techniques) to derive the relevancy score (RS) and a CompAlert value for each category. The relevancy score (RS) may, for example, be a numerical value between 0 and 100. Similarly, the CompAlert may be represented as a numerical value, or alternatively by a predetermined range of values (e.g. "always", "never" and "No Action").

Figure 5:
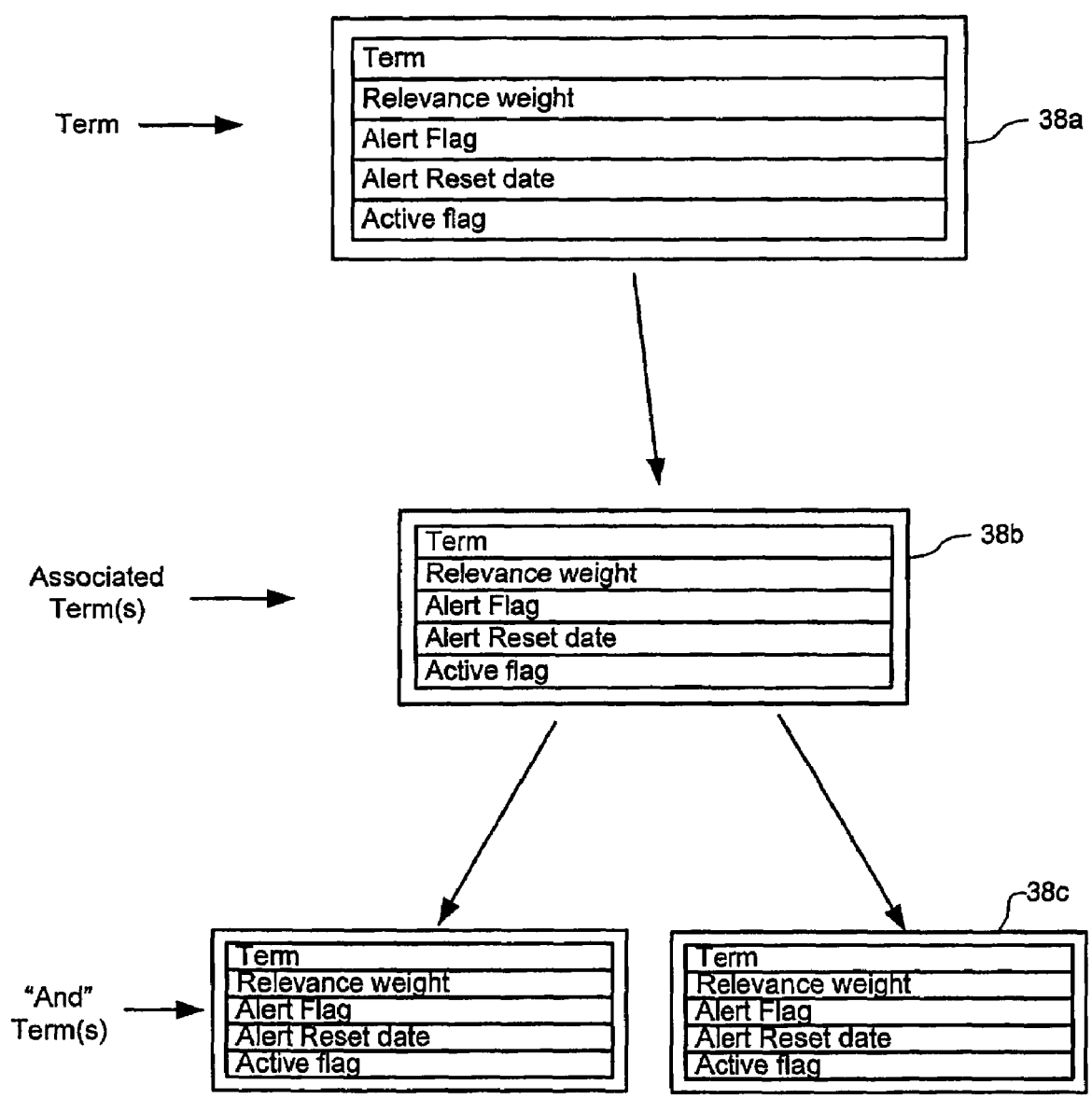
FIG. 5 is a block diagram illustrating hierarchical relationships of a lexicon usable in the method of FIGS. 2a-2b.

As shown in FIG. 5, the taxonomy is provided as a hierarchy of related term records 38. Each term record 38 includes data fields such as, for example, a specified term, which may be a word or phrase and/or synonyms; a relevancy weight; an alert flag; an alert reset date and an active flag. In addition, each term record 38 is linked to an associated term and, possibly, one or more "and" terms. This enables a term in the taxonomy to "inherit" attributes (such as the relevancy weight and alert flag status) of a higher level terms. Preferably, the taxonomy will be designed such that a term may appear in more than one category, with respective different relevancy weight; alert flag; alert reset date and active flag values for each category. Various known techniques may be employed for this purpose including, as just one example, creating a separate "tree" of related terms for each category.

The relevancy weight is preferably provided as a numerical value that can be used directly in the computation of the relevancy score (RS) of an information item in which the specified term appears. Rather than indicating the quality of match to any particular search criteria, the relevancy weight assigned to a term reflects the degree to which the term in question pertains (or is significant) to a particular category. Since this is a subjective assessment that is specific to a particular field of subject matter (e.g. infectious diseases), the relevancy weight is preferably assigned by (or in consultation with) one or more experts in that field. For example, the term "anthrax" may be deemed highly relevant (significant) in some categories (e.g. infectious diseases, bio-terrorism etc.) and of low relevance (significance) to other categories, such as nuclear safety. The relevancy weight can also be dynamically updated, as will be described in greater detail below.

The alert flag is a dynamically updated value that can be used to calculate a CompAlert value representative of a degree of urgency of an information item in which the specified term appears. As may be appreciated, the degree of urgency can be represented in various ways. In a simple embodiment, the alert flag can be used to indicate "hot button" terms in an information item. In this case, the alert flag may be a binary value (e.g. "Yes" or "No") which indicates whether or not expedited handling should be provided. Alternatively, a three-state value (e.g. "Always", "No Action" or "Never") may be used. The "degree of urgency" may also be represented as a numerical value (e.g. between 0 and 10), or a predetermined range of values (e.g. "low", "medium" and "high"). In any event, the value of the alert flag is a subjective assessment that is specific to a particular field of subject matter, and, frequently, a specific event. For example, following identification of a disease outbreak, terms specific to that outbreak (such as, for example "SARS") may be designated as "hot-buttons", and the alert flag values of these terms set to "Always". This will cause every information item containing that term to be given expedited handling, independently of its relevancy score. Once the disease outbreak has concluded, the alert flag value can be reduced.

The alert flag reset date is an optional field that can be used to prompt a review and/or automatic lowering of the alert flag value. This is useful in that it prevents the alert flag value from being inadvertently left at unnecessarily high levels. However, for some terms, such as those relevant to bioterrorism, for example, it will be desired to maintain the alert flag value at a permanently high level. In this case, the alert flag reset date can be set to "never". The "active" flag is another optional field that can be used to control whether or not the term is to be used for determining the relevancy score and/or the urgency of an information item.

As may be appreciated, various techniques may be used to compute the relevancy score (RS) and urgency (CompAlert value) of an information item. For example, the content of the information item can be searched to identify occurrences of term contained in the taxonomy. Such a search may be restricted to terms of each category to which the information item pertains. When a term is found, the relevancy weighting of that term is added to the relevancy score, which is thereby accumulated as each successive taxonomy term is located in the information item. Similarly, the alert flag value of the term can be compared to the current CompAlert value. If the alert flag value is higher, then the CompAlert value is updated with the alert flag value. This results in the CompAlert value accumulating the highest alert flag value across all of the taxonomy terms found in the information item. In cases where a term appears in more than one category, then these steps can be repeated for each involved category, using the respective category-specific relevancy weighting and alert flag values. By this means, a respective relevancy score and CompAlert value will be accumulated for each category. If desired, this information can conveniently be recorded in the item record header, as shown in FIG. 4.

Referring back to FIG. 2a, once the relevancy score and CompAlert value of the information item have been computed, the information item is triaged to determine how it will be handled by the system. In general, triaging utilizes the highest Relevancy Score (RS) and CompAlert values calculated above to identify information items requiring expedited handling and dissemination to interested clients. Principal steps in this operation are described below with reference to FIG. 2b.

Figure 2B:
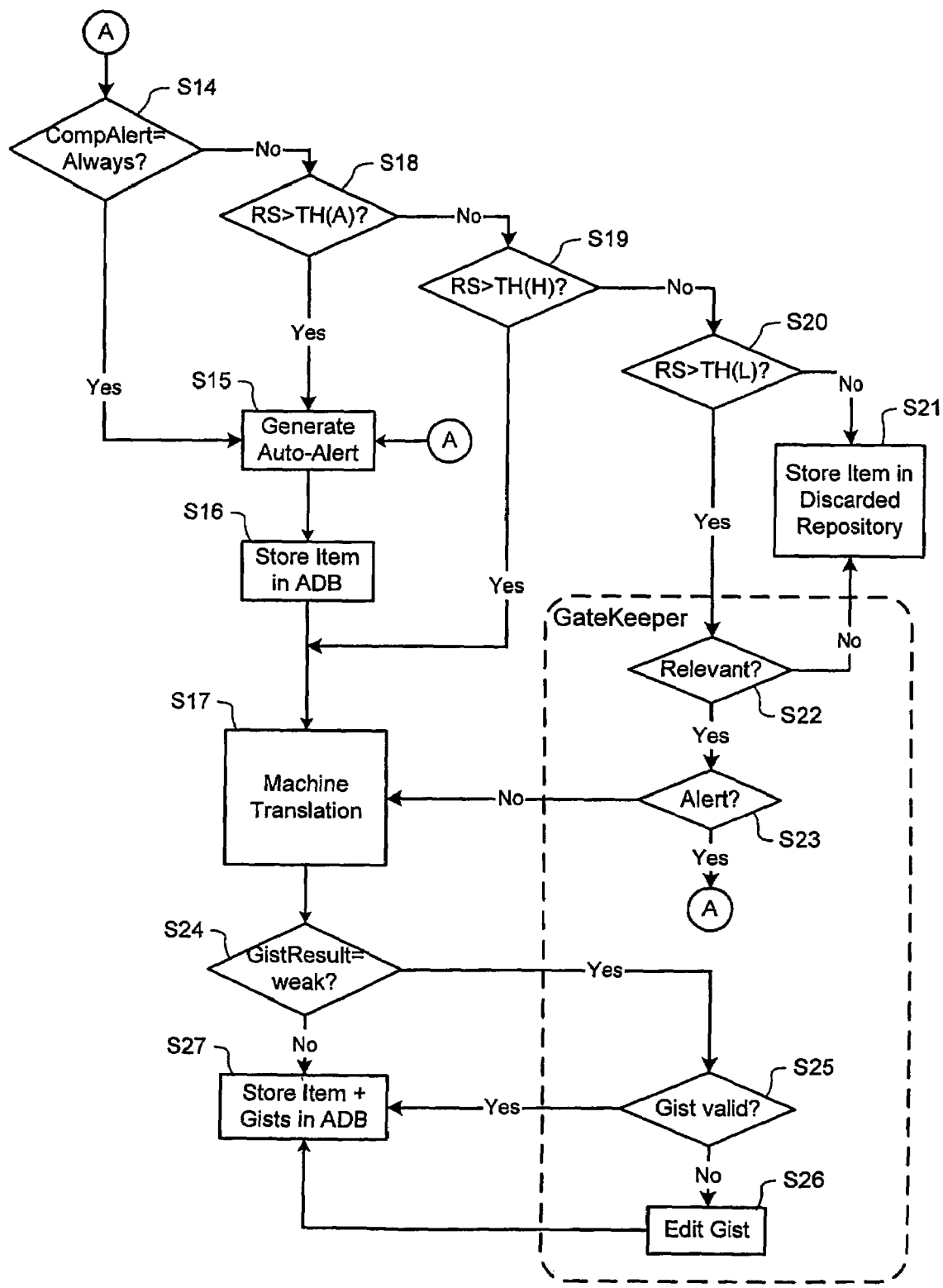

As shown in FIG. 2b, triage of an information item begins by examining the CompAlert value (at step S14). If the rating is "always" (indicating a "hot bottom" term appears in the item), then an "auto-alert" in respect of the information item is generated (at S15). In general, the purpose of an auto-alert is to provide interested clients with advance notice that an information item requiring their immediate attention has been received by the system. The auto-alert can be formulated in various ways. For example, an e-mail containing the information item can be generated and broadcast to all clients who have indicated their interest in the category of the information item. Following generation of the auto-alert, the information item is stored (at step S16) in the Active database 14 so as to be immediately accessible to clients, and passed (at step S17) to the translation engine 18 for machine translation.

In some cases, an information item may be sufficiently relevant that it warrants expedited handling, even if the CompAlert valve is not particularly high. Accordingly, if it is determined that the CompAlert value is not "always" (e.g., the urgency rating is less than a predetermined urgency threshold) then the relevancy score (RS) is compared to an alert threshold value TH(A) (Step S18). If the relevancy score (RS) is above this threshold TH(A), then an "auto-alert" in respect of the information item is generated (step S 15); the information item stored in the Active database 14 (step S16); and the information item forwarded (Step S17) to the translation engine 18 for machine translation as described above.

If the relevancy score lies between the alert threshold TH(A) and a "high" relevance threshold value TH(H) (step S19), then the information item is determined to be relevant, but not urgent, and is forwarded (step S17) to the translation engine 18 for machine translation. If the relevancy score (RS) lies between the "high" relevance threshold TH(H) and a "Low" relevance threshold value TH(L) (step S20), then the information item is determined to be of questionable relevance. In this case, the information item is passed to the gatekeeper 12 for an assessment of its relevance. Finally, if the relevancy score (RS) lies below the "Low" relevance threshold value TH(L), then the information item is determined to be not relevant, and it is archived in a "discarded items" repository (step S21). This enables any such discarded items to be logged (e.g. by an administration server—not shown) for forensic and metrics purposes.

Forwarding items of questionable relevance to the gatekeeper 12 enables a knowledge-based decision to be made concerning the relevance of the item. If the gatekeeper 12 determines that the information item is relevant (at step S22), but not particularly urgent (step S23), then the information item is forwarded to the translation engine (S17) for machine translation. If the gatekeeper 12 determines that the information item is both relevant AND urgent, then an auto-alert can be generated (S15) as described above, before the information item is saved in the Active database (step S16) and forwarded (step S17) to the translation engine 18 for machine translation. Alternatively, if the gatekeeper 12 determines that the information item is not relevant, then it is archived in the "discarded items" repository (step S21). Again, any such discarded items can be logged for forensic and metrics purposes.

As mentioned previously, any information items that are not discarded, are passed to the translation engine 18 for machine translation (step S17). As is known in the art, various machine translation systems are available for translating text information from one language (e.g. English), to another language (e.g. French). At present, the quality of such machine translations frequently depends on the language pair in question. For example, machine translations between English and French are frequently more successful than between English and Japanese. However, for most of the "major" languages (such as for example, the official languages of the World Health Organization: English, French, Spanish, Russian, Arabic and Simplified Chinese) machine translation systems can usually produce a reasonably comprehensible "gist", which contains the essence of the source text.

Accordingly, for each information item, the translation engine generates machine translated "gists" 40 in one or more languages. For example, in a public health context, information items received in any one of the six official World Health Organization (WHO) languages would be machine-translated to produce gists in each of the other five languages. Each gist is saved in the container of a respective item record 32 instantiated for that purpose, to facilitate subsequent indexing, storage and retrieval. However, the header 34 of the gist's item record 32 is populated with language-independent metadata copied from the header 34 of the source information item record 32. This ensures that each of the gists 40 can be indexed, stored and retrieved as successfully as the source item, even if the quality of the gist is imperfect. The expected quality of a translated gist can be described using a "gist strength" value, which is derived from the language pair in question and the specific machine translation system being used. The gist strength, which may be provided as a numerical value (e.g. between 1 and 10) can be stored in a header field of the item record containing the involved gist.

Based on the value of the gist strength, gists of questionable quality may be forwarded (at step S24) (along with their source text) to the gatekeeper 12 for validation. Based on the gatekeeper's review (S25), the gist 40 may be corrected (S26) and/or the gist strength revised to indicate the quality of the gist. In addition, the results of the gatekeeper's review may be used as a feedback to the translation engine 18 to improve translation quality. Feedback provided by clients 26 can also be used for this purpose.

Following machine translation, the information item, and each of its associated gists are stored (step S27) in the active database 14. As mentioned previously, each of these items is preferably stored in association with closely related information items based, for example, on the previously determined category (or categories) to which the information item pertains. Once stored in the active database 14, a client 26 can access and read information items (and/or gists) pertaining to topics of interest to that client.

As described above, the gatekeeper 12 operates to provide various verification, validation, and process control functions. For this purpose, the gatekeeper 12 will normally be provided by some combination of Artificial Intelligence (AI) such as an "expert system", and human intelligence in the form of personnel having expertise in the relevant field. For example, in a public health context, gatekeeper personnel may comprise medical professionals who, by virtue of their training, are able to distinguish between relevant/irrelevant and urgent/non-urgent information items. Artificial Intelligence (AI) expert systems may be used to support the human gatekeeper personnel. Human personnel and/or AI expert systems may also be used to assess the comprehensibility of gists.

In order to minimize latency, information items passed to the gatekeeper 12 can conveniently to placed in a First-In-First-Out (FIFO) queue of a gatekeeper pool 42 (FIG. 1). Upon arrival of an information item, a timer process (not shown) can be initiated to track the time between when the information item is loaded into a queue and when the gatekeeper 12 takes the information item up for review. If the information item is not taken up for review before the timer reaches a predetermined time-out, then the information item may be automatically sent to the translation engine 18 and/or stored in the active database 14. This avoids undesirably excessive latency of each information item. As may be appreciated, different time-out limits may be used, depending on which step of the triage process forwarded the information item to the gatekeeper 12. For example, weak gists associated with urgent information items sent to the gatekeeper for confirmation of gist accuracy may have a relatively short time-out limit (e.g. less than one hour). Conversely, marginally relevant information items sent to the gatekeeper for a final determination of relevance may have a significantly longer time-out limit (e.g. one or more hours).

Figure 6:
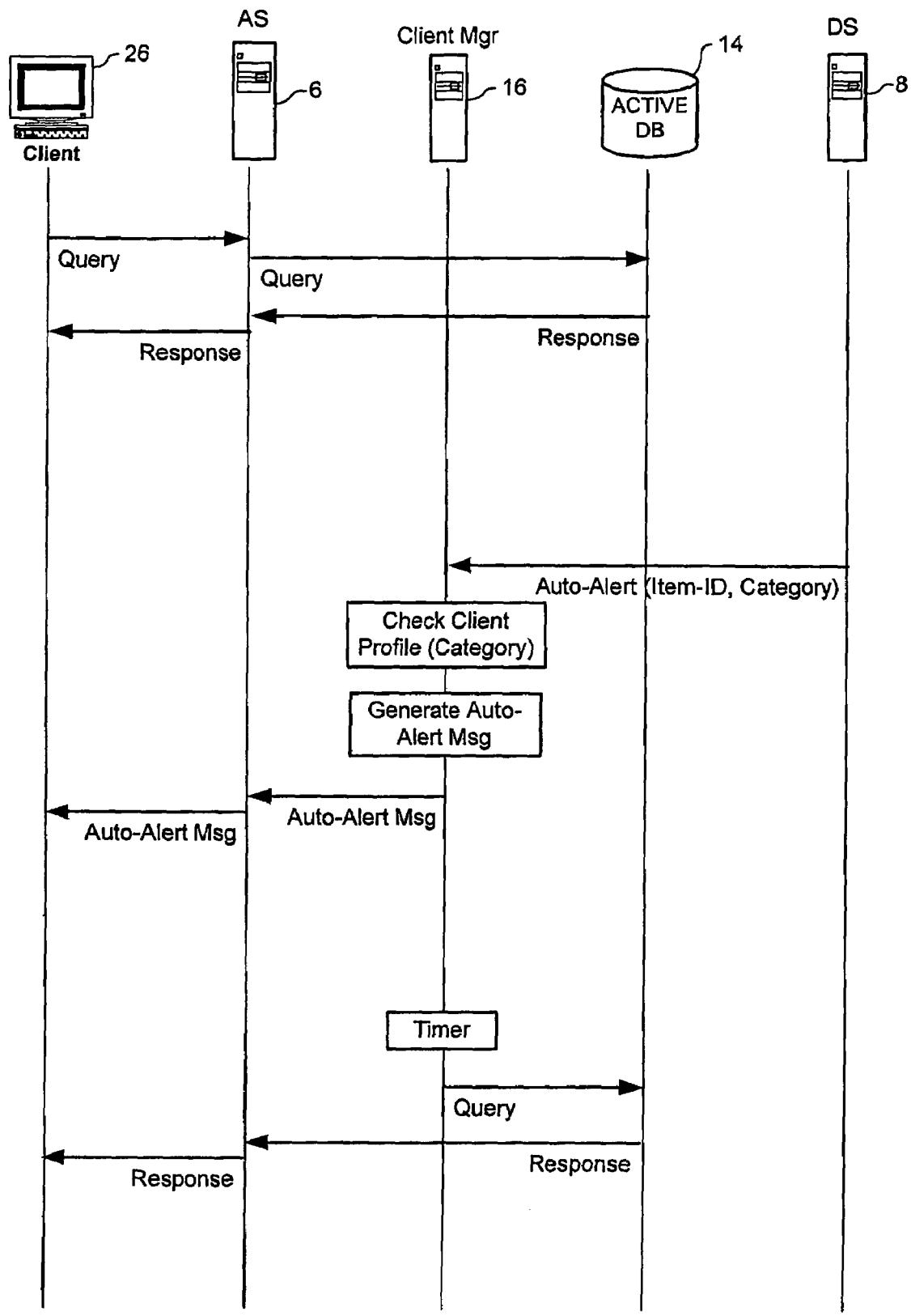
FIG. 6 is a communications flow diagram showing three scenarios for disseminating aggregated information to a client.

As described above, information items and their associated gists are stored in the active database 12. Each client 26 can thus access the system 2 and query the database 14 to obtain information items and/or gists that relate to topics of interest to the client. Additionally, auto-alerts can be sent by the system 2 to each interested client 26. FIG. 6 shows three typical scenarios for disseminating information to interested clients.

In a first scenario, a query is formulated by a client, using narrow search criteria defining topics of interest to the client. These search criteria will preferably be formulated using language-independent meta-data, so that the search results will not be affected by the language of preference of the client. As shown in FIG. 6, the query is sent (through the internet 4) and forwarded to the Active database 14 by the access server 6. The response set generated by the Active database 14 is the routed back to the client 26, via the access server 6 and the internet 4. As will be recognized, this scenario is a typical query-response function, well known in the art.

A second scenario illustrated in FIG. 6 shows one method of handling auto-alerts. In this case, an auto-alert generated by the document server 8 (step S15 of FIG. 2b) is sent to the client manager 16. This auto-alert contains at least the item identifier of the involved information item, and the category of the term(s) that triggered the auto-alert. Upon receipt of the auto-alert, the client manager 16 searches the client profiles to identify each client who has expressed an interest in the identified category. For each identified client, an auto-alert message is generated, and forwarded to the client. The content of the auto-alert may vary depending on preferences information previously provided by each client. For example, in some cases, auto-alert message may take the form of an e-mail containing the entire information item. In other cases, the auto-alert message may be formulated as an "instant message" (IM) containing the item identifier (and possibly a "headline") and transmitted to the client using any of the conventional instant messaging services known in the art. As may be appreciated, Auto-alert messages may be generated and forwarded to clients, even when those clients are not logged into the system 2.

In a third scenario, the client may define a standard query which is accessible by the client manager 16 (e.g. as part of the client profile). At predetermined intervals (e.g. every 0.5 hours while the client is logged into the system), the query is forwarded to the active database 14. In response to the query, the active database generates a response, which is forwarded to the client as described above.

All of the above-noted scenarios can conveniently be implemented by providing each client with a suitable client interface, and by maintaining a respective client profile for each client. Various interface schemes may be employed for this purpose, which are well known in the art. For example, a java applet may be instantiated within a browser window on a client computer, to enable the client 26 to access and Log-on to the information system via the internet 4. Having successfully completed authentication and security checks (e.g. by means a client username and password), the client interface enables the client to formulate queries to search the database 14, review the results of their searches, and possibly perform other functions.

Preferably, the client interface is designed to enable a client 26 to conduct searches in any language supported by the information system 2. This can be accomplished by converting any language-specific keywords, etc. of the client into language-independent meta-data equivalents for the purposes of searching the active database 14. In addition, for each information item located in a search, the system 2 can select source texts or gists, depending on the language preference of the client 26. If the client reviews a gist, and wishes to see the original source text, this information can readily be accessed and retrieved, as required.

The embodiment(s) of the invention described above is(are) intended to be exemplary only. The scope of the invention is therefore intended to be limited solely by the scope of the appended claims.

We claim:

1. A method of aggregating and disseminating time sensitive information, the method comprising steps of:
   searching a data source to identify recently-posted information items matching predetermined selection criteria; and
   for each identified information item:
      calculating a relevance score for the information item based on a content of the information item;
      determining an urgency rating for the information item based on the content of the information item;
      triaging the information item using the urgency rating and the relevance score; and
      disseminating the information item to at least one client based on the triage result;
   wherein triaging the information item comprises, when the urgency rating is less than a predetermined urgency threshold, and the relevance score is between predetermined first and second relevancy thresholds, passing the information item to a gatekeeper, the gatekeeper being operative to assess relevance of the information item;
   wherein the first relevancy threshold is less than the second relevancy threshold; and wherein the step of triaging each information item further comprises, when the urgency rating is less than the predetermined threshold, steps of:
if the relevancy score is greater than a predetermined third relevancy threshold, wherein the third relevancy threshold is greater than the second relevancy threshold:
generating an auto-alert in respect of the information item; and
forwarding the auto-alert to the client.

2. The method as claimed in claim 1, wherein the step of searching a data source comprises steps of:
generating a query based on the predetermined selection criteria; and
repeatedly searching the data source at predetermined intervals using the query.

3. The method as claimed in claim 2, wherein the recently posted information items comprise information items posted during a time period since an immediately previous search.

4. The method as claimed in claim 2, wherein the predetermined interval is based on an estimated update frequency of the data source.

5. The method as claimed in claim 1, wherein the step of searching a data source comprises steps of:
receiving a response set containing the identified information items;
parsing the response set to extract each information item from the response set; and
normalizing a format of each information item.

6. The method as claimed in claim 5, wherein the steps of parsing and normalizing comprise steps of:
providing a respective item record for storing at least a content of each information item; and
copying data of each information item within the response set to its respective item record.

7. The method as claimed in claim 5, further comprising steps of:
identifying duplicate information items; and
discarding any identified duplicate items.

8. The method as claimed in claim 1, wherein the step of searching the data source is repeated for each one of a predetermined set of two or more heterogenous data sources.

9. The method as claimed in claim 1, wherein the step of calculating a respective relevance score for each identified information item comprises steps of:
providing a taxonomy of terms including at least a respective relevance weighting of each term; and
processing content of the information item using the taxonomy to derive a composite relevance score for the information item.

10. The method as claimed in claim 9, wherein the step of processing content of the information item using the taxonomy comprises steps of:
searching the content of the information item to find occurrences of each terms of the taxonomy, and;
for each taxonomy term located in the content, adding the respective relevancy weighting to the composite relevancy score.

11. The method as claimed in claim 9, wherein the taxonomy comprises a plurality of categories of subject matter, and wherein each term of the taxonomy comprises a respective relevancy weighting pertaining to each category.

12. The method as claimed in claim 11, wherein the step of processing content of the information item comprises steps of:
deriving a respective composite relevancy score pertaining to each category of the taxonomy; and
selecting the highest relevancy score.

13. The method as claimed in claim 1, wherein the step of determining a respective urgency rating for each identified information item comprises steps of:
providing a taxonomy of terms including at least a respective alert flag value for each term; and
processing content of the information item using the taxonomy to determine a composite alert status of the information item.

14. The method as claimed in claim 13, wherein the step of processing content of the information item using the taxonomy comprises steps of:
searching the content of the information item to find occurrences of each term of the taxonomy, and;
for each taxonomy term located in the content:
comparing the alert flag value to the composite alert status; and
updating the composite alert status based on the comparison result.

15. The method as claimed in claim 13, wherein the taxonomy comprises a plurality of categories of subject matter, and wherein each term of the taxonomy comprises a respective alert flag value pertaining to each category.

16. The method as claimed in claim 15, wherein the step of processing content of the information item comprises steps of:
deriving a respective composite alert status of the information item pertaining to each category of the taxonomy; and
selecting the highest composite alert status.

17. The method as claimed in claim 1, wherein the step of triaging each information item further comprises, when the urgency rating is above the predetermined threshold, steps of:
generating an auto-alert in respect of the information item; and
forwarding the auto-alert to the client.

18. The method as claimed in claim 17, wherein the auto-alert comprises an e-mail containing either one or both of:
information content of the information item;
data identifying the information item, such that the client can access the information item.

19. The method as claimed in claim 1, wherein the step of triaging each information item further comprises a step of:
if the relevancy score is between the second and third relevancy thresholds, automatically disseminating the information item to the at least one client.

20. The method as claimed in claim 1, wherein the step of triaging each information item further comprises, when the relevancy score is less than the predetermined first relevancy threshold, a step of discarding the information item.

21. The method as claimed in claim 1, wherein the step of disseminating the information item comprises a step of storing the information item in an active database accessible by the at least one client.

22. The method as claimed in claim 21, further comprising steps of:
generating a machine translated gist of the information item; and
storing the machine translated gist in the database in association with the information item.

* * * * *